May 1, 1962     E. J. CATOR     3,032,359

QUICK CONNECT COUPLING

Filed May 5, 1958

INVENTOR.
EDWARD J. CATOR

BY *Fay & Fay*

ATTORNEYS

United States Patent Office 3,032,359
Patented May 1, 1962

3,032,359
QUICK CONNECT COUPLING
Edward J. Cator, Cleveland, Ohio, assignor to Crawford Fitting Company, Cleveland, Ohio, a corporation of Ohio
Filed May 5, 1958, Ser. No. 733,106
1 Claim. (Cl. 285—277)

This invention relates to couplings, and more particularly to snap action couplings.

An object of this invention is to provide a snap action coupling, which by novel design and arrangement of parts, may rapidly be operated simply by using one hand and exerting a predetermined limited force on the stem portion to slide the stem into locking position or exerting on the stem sleeve a predetermined limited force to free the male member from the locking means. It also provides full protection against heavy multidirectional vibrations to prevent a premature separation.

Another object of the invention is to provide a snap action coupling in which the sealing element is so located that even under heavy vibration it will not cause a leakage.

Another object of the invention is to provide a coupling having the above mentioned advantages, which requires relatively few parts, is economical to manufacture, and is sturdy and reliable in service.

Other objects and a fuller understanding of the invention may be observed by referring to the following description and claim taken in conjunction with the accompanying drawings in which:

Figure 1:
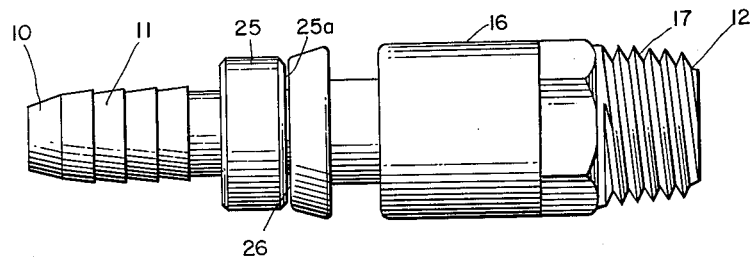
FIG. 1 shows an outside view of the coupling in connected position.

With reference to the drawing, the coupling comprises a male member 10, hereinafter referred to as the stem 10, externally substantially cylindrical, and having an internal bore 27 permitting the continuous flow of fluids therethrough. The stem 10 consists of a connecting portion 11 provided with conventional attaching means, the connecting portion 11 extending approximately up to a stepped up shoulder portion 25 having a face 25A which acts as an abutment. Beyond the shoulder 25, the stem 10 is provided with an annular arcuate groove 24 receiving a snap-action ring 15, while an adjacent external peripheral groove 13 is adapted to receive three detent balls 22 or detents, the internal dimensions of the peripheral groove 13 being such to provide sufficient depth to seat the detent balls 22 to a depth less than half of their diameters. Satisfactory results may be achieved by making the depth of the groove 13 about one-third of the diameter of the detent balls 22.

An axially movable stem sleeve 14 surrounding the stem 10 is substantially cylindrical and is prevented from moving off said stem by said snap-action ring 15. One end of the stem sleeve 14 is internally bored to a diameter which permits movement over the snap-action ring 15, while the other end is internally bored to a somewhat smaller diameter to permit sliding movement of the stem sleeve on the forward portion of the stem 10. The end of the larger diameter is terminated by an abutment or shoulder 28, which bears against the ring 15. A stem sleeve shoulder 26 is so located that in connected position it is in abutment with the stem shoulder 25, while the opposite end of the stem sleeve 14 in connected position extends just beyond the ring 15.

A female coupling member 16 is provided, comprising a detent collar 16b threadedly engaged with a body portion 16a, having an externally threaded section 17 at its tubular end 12. Other attaching means may be provided in any well known manner. The body portion 16a includes an axial passageway comprising inner and outer coaxial counterbores 52 and 54 respectively. Inner counterbore 52 is of a size to receive snugly the forward portion of the stem 10, and is connected with the larger diameter outer counterbore 54 by radial shoulder 56.

The detent collar 16b is provided with an axially directed passageway coaxial with that of the body portion and through which the stem 10 is adapted to pass. Such passageway includes a substantially cylindrical outer section 18 and an adjacent coaxial enlarged diameter inner section 58 connected to the outer section by means of an inwardly sloping shoulder and providing a detent release means in the manner to be hereinafter described. The outer terminus of the detent collar is provided with a radially inwardly depending flange 60. The section 18 and the counterbore 54 are of about the same diameter and of a size to permit sliding movement of a detent carrying sleeve 19, supporting detent balls 22 in radially drilled holes. An internal annular groove 29 in the surface of the counterbore 52 is provided for seating a resilient sealing element 21, such as an O-ring. This groove 29 is located well beyond the juncture of the shoulder 56 with counterbore 52 to insure the utmost sealing protection. The tubular end 12, as depicted in the drawing in locked position, terminates inwardly of the sealing ring 21, and adjacent shoulder 80 of the body portion 16a.

The female member 16 may consist of two independent parts, as shown, suitably connected, permitting easy disassembling, or may be of one solid part, in which case the detent carrying sleeve 19 would consist of a plurality of elements.

Figure 5:
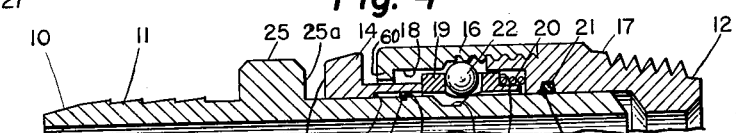
FIG. 5 is a fragmentary vertical cross-sectional view of the coupling in an assumed stage of withdrawal.
Figure 7:
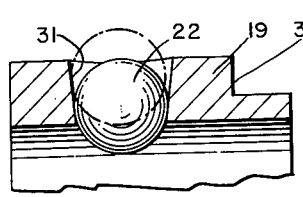
FIG. 7 is a fragmentary vertical cross-sectional view of the detent carrying sleeve showing the tapered openings retaining the detent balls.

At one end the detent carrying sleeve 19 has a somewhat smaller outside diameter where it supports a coil spring 20 as shown in FIG. 5. The coil spring 20 bears against the co-operating shoulder 30 formed by the two external diameters. The detent carrying sleeve 19 is internally bored to a sliding fit on the stem member 10 and the apertures 31 are tapered to retain the detent balls 22. As illustrated in FIG. 7, the detent balls 22 are prevented from sliding out entirely by inclined walls. The detent carrying sleeve 19 is detained within the coupling member 16 on the one end by flange 60 of the detent collar 18.

Figure 6:
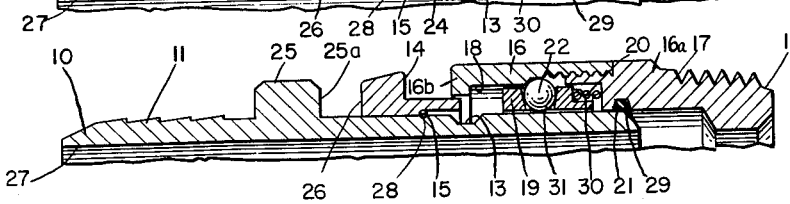
FIG. 6 is a fragmentary vertical cross-sectional view of the coupling in an assumed stage of engagement showing the coupling sealed, but not locked.

For operating my quick connect coupling when the coupling is in unlocked position as shown in FIG. 6, the stem 10 is inserted forwardly into the coupling member 16 and an axial force is applied at the stem 10 as indicated by the arrow to move it longitudinally until it engages the detent balls 22. The detent balls 22 are blocked from outward radial movement and therefore the detent carrying sleeve 19 will move axially against the opposing pressure of the sleeve operating spring 20 compressing same until the rearward section 58 in the coupling member 16 is reached and the detent balls 22 are able to move radially outwardly thus giving way for the stem 10 to pass into the counterbore 52.

Figure 2:
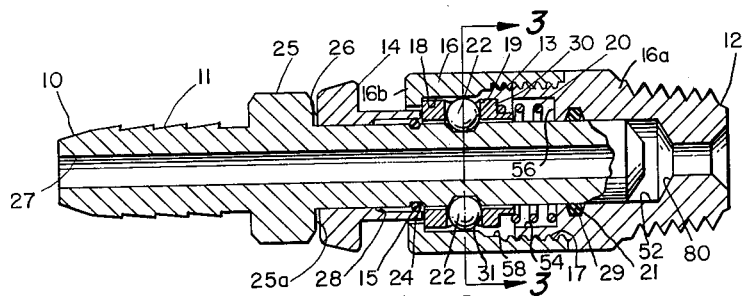
FIG. 2 is a longitudinal cross-sectional view of the coupling shown in FIG. 1, illustrating the coupling in locked position.
Figure 3:
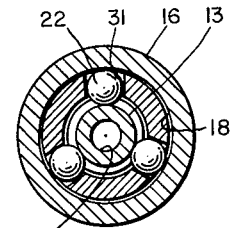
FIG. 3 is a cross-sectional view taken along the line 3—3 of FIG. 2.
Figure 4:
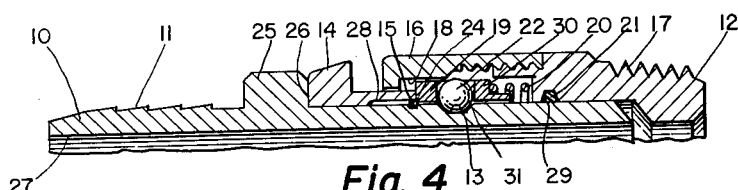
FIG. 4 is a fragmentary vertical cross-sectional view of the coupling in an assumed operational stage just prior to connection or disconnection.

When the annular groove 13 of the stem 10 reaches the detent balls 22, the pressure of the sleeve operating spring 20 will position the detent balls 22 in the annular groove 13. Taking the force of the stem 10, the sleeve operating spring 20 will move the detent carrying sleeve 19 and stem 10 axially rearwardly until the detent carrying sleeve comes into abutting engagement with the detent collar 18 and detent balls are confined against outward radial movement by the cylindrical section 58. In this position the coupling is locked as shown in FIG. 2.

To unlock the coupling, an axial force is applied to the stem sleeve 14, thus moving the detent carrying sleeve 19 as shown in FIG. 5 and the stem 10 toward the larger diameter section 58 of the coupling member 16. When the detent balls 22 reach this position, the detent balls are able to move radially outwardly. Thus the stem 10 is unlocked and may slide out.

Thus it will be apparent to those skilled in the art that the coupling of the present invention is adapted for simple one-hand operation, for both coupling and uncoupling operations, and only requires relatively simple manual movement. The coupling herein provides a snap-action coupling, which provides protection against leakage of fluid through the coupling even under operating conditions causing relatively heavy vibration of the device, the same being accomplished without destroying the efficiency of the coupling and without excessive wear and tear of the parts.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What is claimed is:

A coupling comprising an elongated male member having a generally cylindrical external surface, a female member including a body portion having an axial passageway and having inner and outer coaxial counterbores joined to said axial passageway by a substantially radial shoulder, the outer counterbore being of greater diameter than the inner and being connected therewith by a first radial shoulder, a detent collar having an axially directed passageway defining an outer substantially cylindrical detent locking section and an inner coaxial enlarged diameter detent release section adjacent the outer section and connected therewith by an inwardly sloping shoulder, the body portion and the detent collar of the female member being threadedly interconnected to form a socket within which the male member is removably received with the forward end of such male member being snugly fitted within the inner counterbore of the body portion, the inner counterbore being provided with an annular groove spaced from the juncture between such counterbore and the first radial shoulder, a seal ring received within the groove and engaging the male member to establish a fluid tight seal, the outer counterbore, the inner enlarged diameter detent release section and the outer cylindrical detent locking section together forming an annular chamber surrounding the male member intermediate its ends, an annular detent carrying sleeve reciprocally mounted in the chamber and surrounding the male member, compression spring means engaging the detent carrying sleeve and the first radial shoulder and normally urging the detent carrying sleeve into the portion of the chamber defined by the outer cylindrical detent locking section, the detent carrying sleeve being provided with a plurality of circumferentially spaced radial ball detent receiving apertures extending therethrough, a plurality of radially displaceable detent balls, one disposed in each aperture and having a diameter in excess of the length of its associated aperture, means to prevent total displacement of the detent balls from the apertures, an annular circumferential groove provided in the external surface of the male member and spaced from the inner end thereof a distance less than the distance between said inwardly sloping shoulder and said substantially radial shoulder, radially inner portions of the detent balls extending into such groove and engaging the walls thereof, radially outer portions of the detent balls engaging the outer cylindrical detent locking section of the detent collar to maintain the detent balls in such groove and to lock the male member in place, a radially inwardly depending flange at the outer terminus of the detent collar forming an abutment for the detent carrying sleeve, a stem sleeve reciprocally carried on the male member adjacent the detent collar, means to limit the reciprocation of the stem sleeve including an internal abutment provided on such stem sleeve and a snap ring carried on the male member for intermittent engagement with such abutment, one end of such stem sleeve being opposed to the detent carrying sleeve and positioned for engagement therewith upon the inner end of the male member being substantially moved into engagement with said substantially radially extending shoulder to reciprocate the detent carrying sleeve and move the detent balls into the inner enlarged diameter detent release section so that such balls may be radially outwardly displaced by the walls of the annular groove on the male member to allow withdrawal of the male member, the threaded interconnection between the detent collar and the body portion forming a parting surface extending to the chamber within which the detent carrying sleeve and compression spring are received to allow disassembly of the detent collar from the body portion for ready removal of the detent carrying collar and spring for replacement and cleaning.

References Cited in the file of this patent

UNITED STATES PATENTS

| | | |
|---|---|---|
| 1,179,971 | Stichler | Apr. 18, 1916 |
| 1,587,079 | Machino | June 1, 1926 |
| 2,394,236 | Eastman | Feb. 5, 1946 |
| 2,429,202 | Estill | Oct. 21, 1947 |
| 2,552,543 | Earle | May 15, 1951 |
| 2,627,580 | Picard | Feb. 3, 1953 |
| 2,736,578 | Rafferty | Feb. 28, 1956 |

FOREIGN PATENTS

| | | |
|---|---|---|
| 1,121,046 | France | Apr. 20, 1956 |